(12) United States Patent
Lin et al.

(10) Patent No.: US 10,013,210 B2
(45) Date of Patent: Jul. 3, 2018

(54) DATA STORAGE DEVICE AND DATA MAINTENANCE METHOD THEREOF

(71) Applicant: Silicon Motion, Inc., Jhubei, Hsinchu County (TW)

(72) Inventors: Chien-Cheng Lin, Yilan (TW); Jie-Hao Lee, Kaohsiung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 60 days.

(21) Appl. No.: 15/284,154

(22) Filed: Oct. 3, 2016

(65) Prior Publication Data

US 2017/0115933 A1  Apr. 27, 2017

(30) Foreign Application Priority Data

Oct. 22, 2015  (TW) .............................. 104134631 A (51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/064* (2013.01); *G06F 3/0688* (2013.01); *G06F 12/10* (2013.01); *G06F 2212/657* (2013.01)

(58) Field of Classification Search
CPC ...... G06F 3/0604; G06F 3/0659; G06F 3/064; G06F 3/0688; G06F 12/10; G06F 2212/657
See application file for complete search history.

(56) References Cited

U.S. PATENT DOCUMENTS

| 2015/0006784 A1 | 1/2015 | Avila et al. |
| 2015/0120988 A1* | 4/2015 | Hung .................. G06F 12/0246 711/103 |

FOREIGN PATENT DOCUMENTS

| TW | I425515 | 2/2014 |
| TW | I431626 | 3/2014 |
| TW | 201513121 | 4/2015 |

* cited by examiner

*Primary Examiner* — Reginald Bragdon
*Assistant Examiner* — Mehdi Namazi
(74) *Attorney, Agent, or Firm* — McClure, Qualey & Rodack, LLP (57) ABSTRACT

The present invention provides a data storage device including a flash memory and a controller. The controller equally distributes the TLC-data blocks into three regions. In a first stage, the controller determines a first TLC-data block corresponding to the logic address of a prewrite data sector, defines the region that contains the first TLC-data block as a first region, and determines whether the first TLC-data block has valid data. When the first TLC-data block does not have valid data, the controller selects a second TLC-data block and a third TLC-data block from the regions other than the first region for writing the prewrite data sector, into the first TLC-data block, the second TLC-data block and the third TLC-data block by a SLC storage mode.

16 Claims, 9 Drawing Sheets

| logic address | TLC-data-block |
|---|---|
| H_1 | F_1 |
| H_2 | F_2 |
| ⋮ | ⋮ |
| H_N/3 | F_N/3 |
| H_N/3+1 | F_N/3+1 |
| H_N/3+2 | F_N/3+2 |
| ⋮ | ⋮ |
| H_2N/3 | F_2N/3 |
| H_2N/3+1 | F_2N/3+1 |
| H_2N/3+2 | F_2N/3+2 |
| ⋮ | ⋮ |
| H_N-1 | F_N-1 |

Rows 1 to N/3: R1
Rows N/3+1 to 2N/3: R2
Rows 2N/3+1 to N-1: R3

FIG. 3

| logic address | TLC-data-block | |
|---|---|---|
| H_1 | F_1 | ⎫ |
| H_2 | F_2 | ⎬ R1 |
| ⋮ | ⋮ | |
| H_300 | F_300 | ⎭ |
| H_301 | F_301 | ⎫ |
| H_302 | F_302 | |
| ⋮ | ⋮ | ⎬ R2 |
| H_600 | F_600 | ⎭ |
| H_601 | F_601 | ⎫ |
| H_602 | F_602 | |
| ⋮ | ⋮ | ⎬ R3 |
| H_900 | F_900 | ⎭ |

DATA STORAGE DEVICE AND DATA MAINTENANCE METHOD THEREOF

CROSS REFERENCE TO RELATED APPLICATIONS

This Application claims priority of Taiwan Patent Application No. 104134631, filed on Oct. 22, 2015, the entirety of which is incorporated by reference herein.

BACKGROUND OF THE INVENTION

Field of the Invention

The present invention is related to a data maintenance method for a data storage device, in particular related to a data maintenance method of triple-level cell.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory uses floating gate transistors. The floating gates of the floating gate transistor may catch electronic charges for storing data. However, the electronics might undergo loss from the floating gate due to the operation of the flash memory or various environmental parameters, which can affect data retention. The Triple-Level Cell (TLC) of the flash memory is much more easily affected by the environment than a Single-Level Cell (SLC) or a Multi-Level Cell (MLC). It should be noted that the eMMC module is generally mounted on a motherboard. Therefore, the eMMC modules will pass through the high-temperature stove along with the motherboard, which might lead to data loss.

BRIEF SUMMARY OF THE INVENTION

A detailed description is given in the following embodiments with reference to the accompanying drawings.

An exemplary embodiment provides a data storage device including a flash memory and a controller. The flash memory has a plurality of SLC-spare blocks, a plurality of TLC-data blocks, and a plurality of TLC-spare blocks. The controller equally distributes the TLC-data blocks into three regions. The regions have the same number of TLC-data blocks. The controller further receives a prewrite data sector and a logic address of the prewrite data sector, and obtains a first sub-prewrite data sector, a second sub-prewrite data sector and a third sub-prewrite data sector according to the prewrite data sector and the logic address, wherein in a first stage, the controller further determines a first TLC-data block corresponding to the logic address according to the logic address, defines the region that contains the first TLC-data block as a first region, and determines whether the first TLC-data block has valid data, wherein in the first state, when the first TLC-data block does not have valid data, the controller respectively selects a second TLC-data block and a third TLC-data block from the regions other than the first region according to the first TLC-data block, respectively writes the first sub-prewrite data sector, the second sub-prewrite data sector and the third sub-prewrite data sector into the first TLC-data block, the second TLC-data block and the third TLC-data block by a SLC storage mode, and maps the first TLC-data block, the second TLC-data block and the third TLC-data block to the logic address.

Another exemplary embodiment provides a data maintenance method applied to a data storage device having a plurality of SLC-spare blocks, a plurality of TLC-data blocks, and a plurality of TLC-spare blocks. The data maintenance method includes: receiving a prewrite data sector and a logic address of the prewrite data sector, and obtaining a first sub-prewrite data sector, a second sub-prewrite data sector and a third sub-prewrite data sector according to the prewrite data sector and the logic address; writing a prewrite data sector into at least one of the TLC-data blocks according to the logic address in a first stage, wherein the step of writing the prewrite data sector into the TLC-data blocks according to the logic address further includes: equally distributing the TLC-data blocks into three regions, wherein the regions have the same number of TLC-data blocks; determining a first TLC-data block corresponding to the logic address according to the logic address, and defining the region that contains the first TLC-data block as a first region; determining whether the first TLC-data block has valid data; selecting a second TLC-data block and a third TLC-data block, respectively, from the regions other than the first region according to the first TLC-data block when the first TLC-data block does not have valid data; respectively writing the first sub-prewrite data sector, the second sub-prewrite data sector and the third sub-prewrite data sector into the first TLC-data block, the second TLC-data block and the third TLC-data block by a SLC storage mode; and mapping the first TLC-data block, the second TLC-data block and the third TLC-data block to the logic address.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
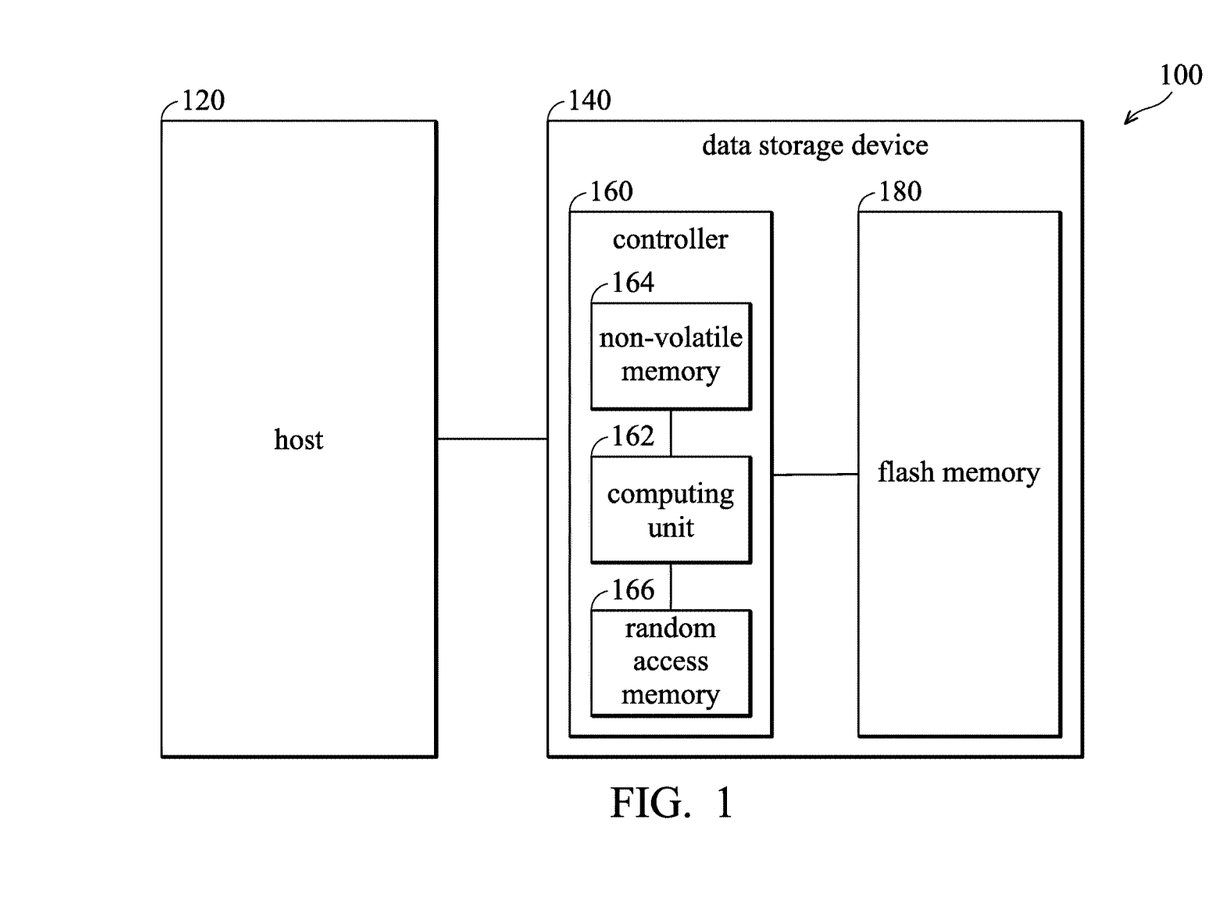
FIG. 1 is a schematic diagram illustrating an electronic system, constructed in accordance with an embodiment.

FIG. 1 is a schematic diagram illustrating an electronic system, constructed in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware. The flash memory 180 includes a plurality of blocks, each of the blocks has a plurality of pages, wherein the minimum write unit of the flash memory 180 is a page, and the minimum erase unit of the flash memory 180 is a block.

Figure 2:
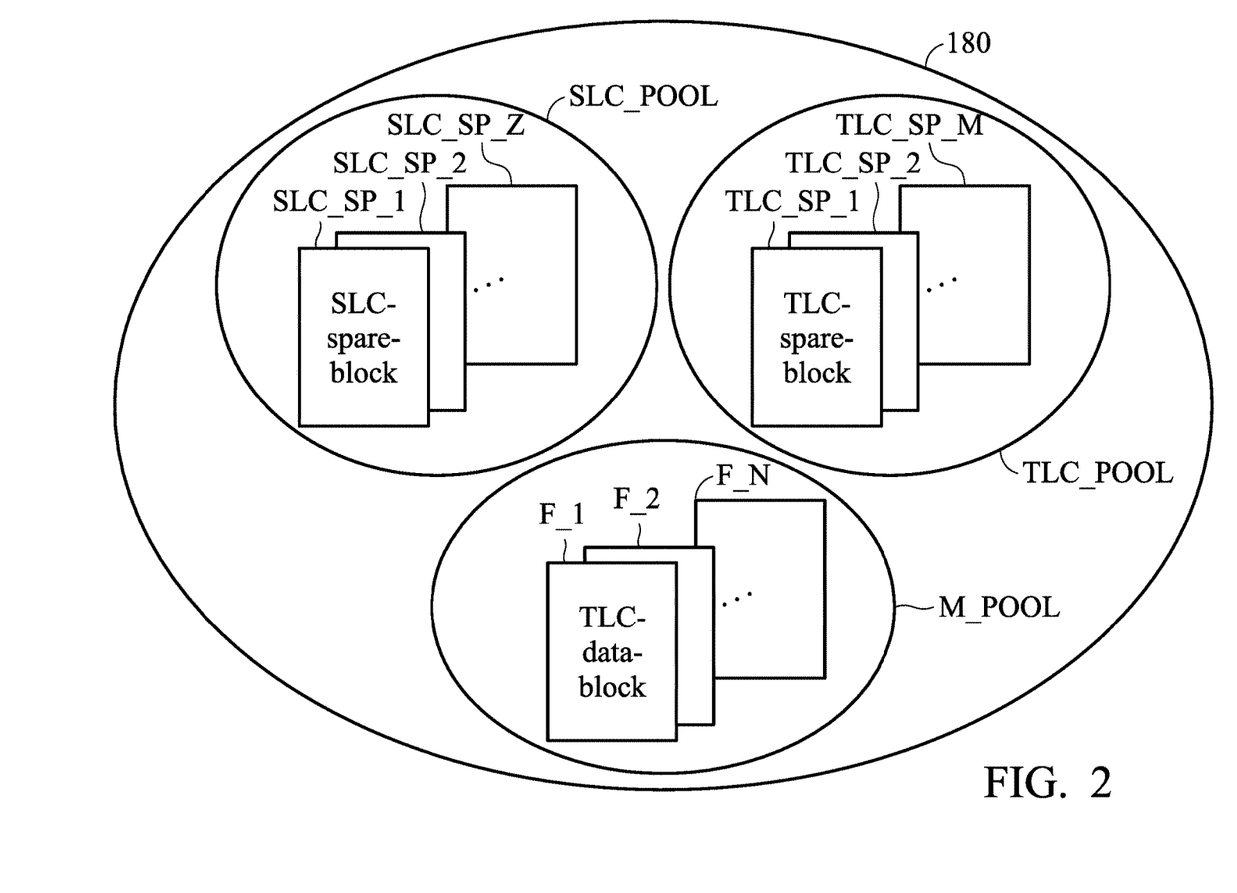
FIG. 2 is a schematic diagram illustrating a flash memory, constructed in accordance with an embodiment.
Figure 3:
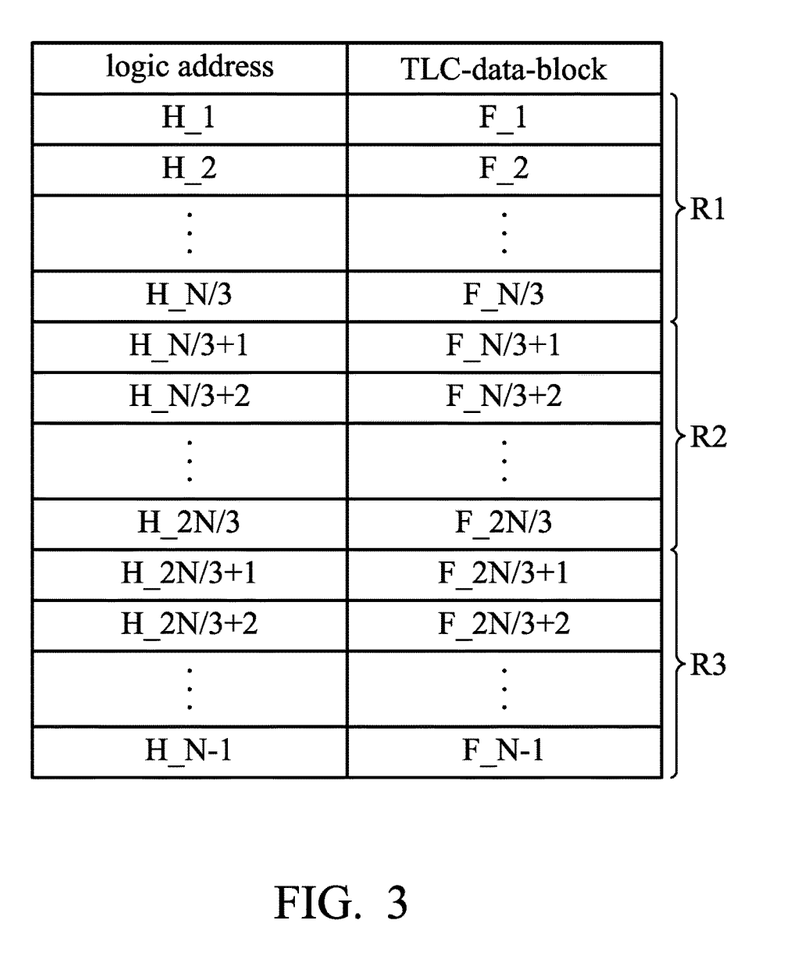
FIG. 3 is a schematic diagram illustrating logic addresses and a TLC-data block, constructed in accordance with an embodiment.

FIG. 2 is a schematic diagram illustrating a flash memory, constructed in accordance with an embodiment. As shown in FIG. 2, the flash memory 180 has a SLC-spare pool SLC_POOL, a TLC-spare pool TLC_POOL and a TLC-data pool M_POOL. The SLC-spare pool SLC_POOL includes a plurality of SLC-spare blocks SLC_SP_1~SLC_SP_Z, wherein "SLC" is the abbreviation of "Single-Level Cell", the total number of SLC-spare blocks is "Z", and the size of SLC-spare block is equal to the block, but it is not limited thereto. Namely, the SLC-spare blocks SLC_SP_1~SLC_SP_Z are the blocks of the flash memory 180 that are arranged to be written by the SLC storage mode. It should be noted that the SLC-spare blocks SLC_SP_1~SLC_SP_Z of the SLC-spare pool SLC_POOL are arranged to store the data that is going to be programmed into the TLC-spare pool TLC_POOL. The TLC-spare pool TLC_POOL includes a plurality of TLC-spare blocks TLC_SP_0~TLC_SP_M, wherein "TLC" is the abbreviation of "Triple-Level Cell', the total number of SLC-spare blocks is "M", and the size of the TLC-spare block is equal to the block. Namely, the TLC-spare blocks TLC_SP_0~TLC_SP_M are the blocks of the flash memory 180 that are arranged to be written by the TLC storage mode. It should be noted that the TLC-spare pool TLC_POOL is arranged to provide the TLC-spare blocks TLC_SP_0~TLC_SP_M that are without valid data and available to be written, and the TLC-spare block which is written with valid data will be exchanged with a TLC-data block without valid data in the TLC-data pool M_POOL. The TLC-data pool M_POOL has a plurality of TLC-data blocks F_1~F_N, wherein "N" is the total number of SLC-spare blocks, and the size of the TLC-data block is equal to the block. Namely, the TLC-data blocks F_1~F_N are arranged to be written with valid data. It should be noted that the TLC-data pool M_POOL is arranged to provide memory space for users to store data. More specifically, the TLC-data blocks F_1~F_N are respectively assigned to a plurality of logic addresses H_1~H_N, wherein each of the TLC-data blocks F_1~F_N corresponds to one of the logic addresses H_1~H_N, as shown in FIG. 3. More specifically, the TLC-data block F_1 is assigned to the logic address H_1, the TLC-data block F_2 is assigned to the logic address H_2, the TLC-data block F_3 is assigned to the logic address H_3, the TLC-data block F_4 is assigned to the logic address H_4, and so on. Moreover, the TLC-data blocks F_1~F_N and the logic addresses H_1~H_N are arranged from top to bottom according to the addresses.

In one of the embodiments, the flash memory 180 operates by the Triple-Level Cell (TLC) mode. Namely, the TLC-data blocks F_1~F_N of the TLC-data pool M_POOL are Triple-Level Cells. It should be noted that, the triple-level cell is the storage cell obtained by programming a single-level cell. The memory space of the triple-level cell is three times the single-level cell. Although the memory space of the triple-level cell is larger than the single-level cell, the triple-level cell is much more easily affected by the environment, especially the flash memory of Embedded Multi Media Card (eMMC). The eMMC module will pass through the high-temperature stove along with the motherboard, meaning that the data stored in the eMMC module can easily become damaged by the high temperature of the stove. Therefore, present invention provides a data storage device 140 that uses the TLC-data blocks F_1~F_N of the TLC-data pool M_POOL as a single-level cell to write the prewrite data sector into the TLC-data blocks F_1~F_N by SLC mode before passing through the stove (the first stage). It should be noted that, when the TLC-data blocks F_1~F_N of the TLC-data pool M_POOL are used as the single-level cell, the memory space of the TLC-data pool M_POOL will be decreased to be one third of the TLC-data blocks F_1~F_N that are written by the TLC mode. Next, after passing through the stove (the second stage), the data storage device 140 can program the prewrite data sector written by the SLC mode in the TLC-data blocks F_1~F_N into triple-level cells. In one of the embodiments, the first stage is the Production Phase, the second stage is the Integration Phase after the first stage, and the data storage device goes through a high temperature soldering event between the first stage and the second stage, but it is not limited thereto.

For example, the controller 160 is configured to write a prewrite data sector into at least one of the logic addresses H_1~H_N according to the order of the logic address H_1~H_N in the first stage.

Figure 4:
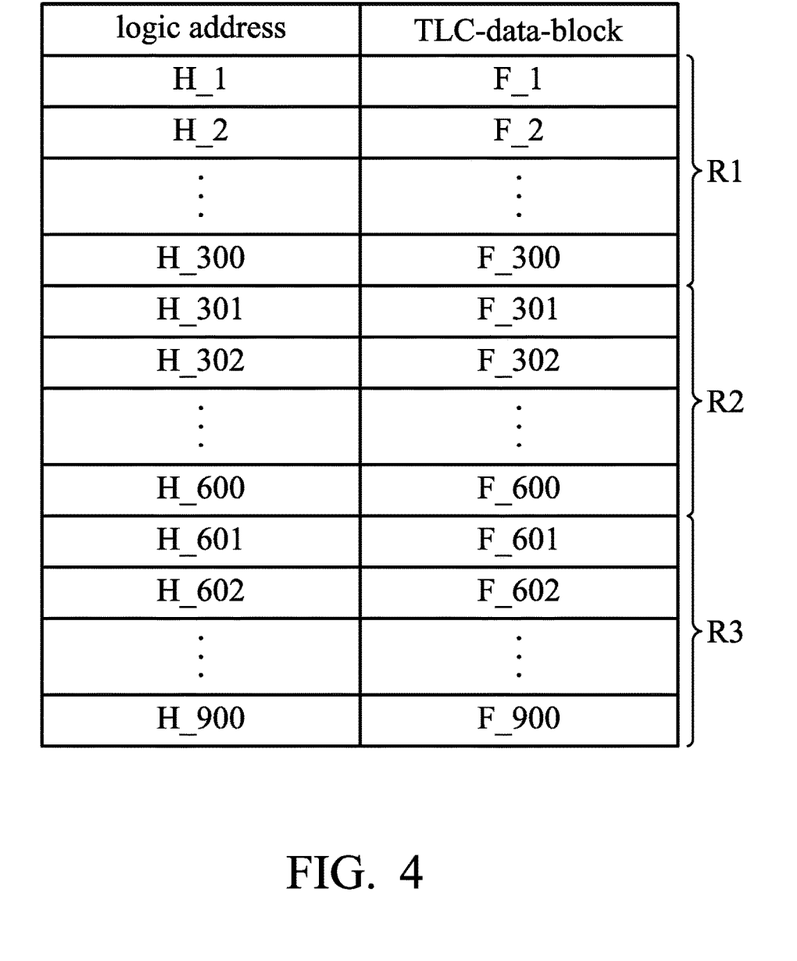
FIG. 4 is a schematic diagram illustrating logic addresses and a TLC-data block, constructed in accordance with another embodiment.

In one of the embodiments, the controller 160 equally distributes the TLC-data blocks F_1~F_N into three regions. More specifically, the controller 160 sequentially assigns the TLC-data blocks F_1~F_N to a first region R1, a second region R2 and a third region R3 for selecting the TLC-data blocks F_1~F_N as the single-level cell without sequence, but it is not limited thereto. In one of the embodiments, the first region R1, the second region R2 and the third region R3 have the same number of TLC-data blocks. Namely, when the total number of logic addresses is "N", each of the first region R1, the second region R2 and the third region R3 has N/3 number of logic addresses, N/3 number of TLC-data blocks assigned to the N/3 logic addresses, and the addresses of each of the first region R1, the second region R2 and the third region R3 are in sequence, as shown in FIG. 3. Namely, the first region R1 includes the logic addresses H_1~H_N/3 having sequential addresses, and includes the TLC-data blocks F_1~F_N/3 having sequential addresses. The second region R2 includes the logic addresses H_N/3+1~H_2N/3 having sequential addresses, and the TLC-data blocks F_N/3+1~F_2N/3 having sequential addresses. The third region R3 includes the logic addresses H_2N/3+1~H_N having sequential addresses, and the TLC-data block F_2N/3+1~F_N having sequential addresses. For example, when the total number of logic addresses H_0~H_N is 900, the first region R1 has the logic addresses H_1~H_300 and the TLC-data blocks F_1~F_300, the second region R2 has the logic addresses H_301~H_600 and the TLC-data blocks F_301~F_600, and the third region R3 has the logic addresses H_601~H_900 and the TLC-data blocks F_601~F_900, as shown in FIG. 4. In other embodiments, "N" can be other rational numbers. Moreover, when "N" cannot be divided evenly by 3, the controller 160 can ignore the remaining one or two TLC-data blocks. For example, "N" is 900 when the total number of TLC-data blocks is 901, and "N" is 1200 when the total number of TLC-data blocks is 1202, but it is not limited thereto.

After the TLC-data blocks F_1~F_N are distributed into the first region R1, the second region R2 and the third region R3, the controller 160 divides the prewrite-data into a plurality of prewrite data sectors and writes the prewrite data sectors into the logic addresses. It should be noted that the controller 160 divides the prewrite-data into the prewrite data sectors according to the size of the triple-level cell. Namely, the data length of each of the prewrite data sectors is equal to the data length of the triple-level cell and is three times the data length of the single-level cell. More specifically, the controller 160 selects a first TLC-data block from the first region R1, selects a second TLC-data block from the second region R2 and selects a third TLC-data block from the third region R3 for writing the first prewrite data sector into the first TLC-data block, the second TLC-data block and the third TLC-data block by a SLC storage mode, and maps the first TLC-data block, the second TLC-data block and the third TLC-data block to the first logic address according to a first write command arranged to write a first prewrite data sector of the prewrite-data to the first logic address indicated by a of the logic addresses H_1~H_N. After the first write command is finished, the controller 160 further selects a fourth TLC-data block from the first region R1, selects a fifth TLC-data block from the second region R2 and a sixth TLC-data block from the third region R3 for writing the second prewrite data sector into the fourth TLC-data block, the fifth TLC-data block and the sixth TLC-data block by the SLC storage mode, and maps the fourth TLC-data block, the fifth TLC-data block and the sixth TLC-data block to the second logic address according to a second write command arranged to write a second prewrite data sector of the prewrite-data into a second logic address of the logic address H_1~H_N. After the second write command is finished, the controller 160 further selects a seventh TLC-data block from the first region R1, selects a eighth TLC-data block from the second region R2 and a ninth TLC-data block from the third region R3 for writing the third prewrite data sector into the seventh TLC-data block, the eighth TLC-data block and the ninth TLC-data block by the SLC storage mode, and maps the seventh TLC-data block, the eighth TLC-data block and the ninth TLC-data block to the third logic address according to a third write command arranged to write a third prewrite data sector of the prewrite-data into a third logic address of the logic address H_1~H_N, and so on, until all of the prewrite data sectors are written to the logic addresses.

It should be noted that, in some embodiments, the controller 160 writes the prewrite data sector into three SLC-spare blocks of the SLC-spare pool SLC_POOL, and exchanges the three written SLC-spare blocks with three TLC-data blocks of the first region R1, the second region R2 and the third region R3, but it is not limited thereto. In other embodiments, the controller 160 writes the prewrite data sector into three SLC-spare blocks of the SLC-spare pool SLC_POOL, and exchanges the three written SLC-spare blocks with three TLC-data blocks selected from the first region R1, the second region R2 and the third region R3.

It should be noted that the controller 160 selects the first TLC-data block from the first region R1 according to the TLC-data block assigned to the first logic address, and the first TLC-data block is the TLC-data block assigned to the first logic address. Moreover, the address of the first TLC-data block plus N/3 is equal to the address of the second TLC-data block, and the address of the first TLC-data block plus (2N)/3 is equal to the addresses of the third TLC-data block. Similarly, the controller 160 selects the fourth TLC-data block and the seventh TLC-data block from the first region R1 according to the TLC-data blocks assigned to the second logic address and the third logic address, the fourth TLC-data block is the TLC-data block assigned to the second logic address, and the seventh TLC-data block is the TLC-data block assigned to the third logic address, and so on. The address of fourth TLC-data block plus N/3 is equal to the address of the fifth TLC-data block, the address of the seventh TLC-data block plus N/3 is equal to the address of the eighth TLC-data block, the fourth TLC-data block plus (2N)/3 is equal to the address of the sixth TLC-data block, and the address of the seventh TLC-data block plus (2N)/3 is equal to the address of the ninth TLC-data block, and so on. It should be noted that, in this embodiment, the mapping relationship of the TLC-data block and the logic address can be maintain by at least one mapping table. For example, the flash memory 180 may have a first mapping table arranged to record the relationships of the TLC-data blocks and their corresponding logic addresses. The flash memory 180 may further include a second mapping table arranged to record the relationships of the TLC-data blocks written by the prewrite data sectors and the corresponding logic addresses, wherein the TLC-data blocks written by the prewrite data sectors can be directly mapped to the corresponding logic addresses, or the TLC-data blocks written by the prewrite data sectors can be mapped to the TLC-data blocks assigned to the corresponding logic addresses, but it is not limited thereto.

Figure 5:
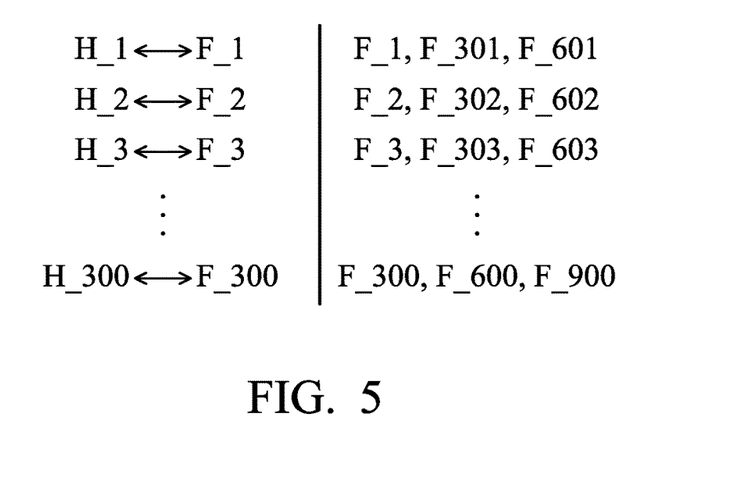
FIG. 5 is a schematic diagram illustrating mapping relationship of blocks, constructed in accordance with an embodiment.

For example, in the embodiment of FIG. 4, the controller 160 divides the prewrite-data into a plurality of prewrite data sectors in response to commands, and sequentially writes the prewrite data sectors to the logic addresses H_0~H_N according to the order of the logic addresses H_0~H_N, as shown in FIG. 5. More specifically, after receiving a prewrite data sector and a logic address, the controller 160 obtains a first sub-prewrite data sector, a second sub-prewrite data sector and a third sub-prewrite data sector according to the received prewrite data sector and the received logic address. Next, the controller 160 determines a first TLC-data block corresponding to the logic address according to the logic address, defines the region that contains the first TLC-data block as first region, and determines whether the first TLC-data block has valid data. When the first TLC-data block does not have valid data, the controller 160 selects a second TLC-data block and a third TLC-data block from the regions other than the first region according to the first TLC-data block, writes the first sub-prewrite data sector, the second sub-prewrite data sector and the third sub-prewrite data sector respectively into the first TLC-data block, the second TLC-data block and the third TLC-data block by the SLC storage mode, and maps the first TLC-data block, the second TLC-data block and the third TLC-data block to the logic address. More specifically, the controller 160 obtains a first sub-prewrite data sector, a second sub-prewrite data sector and a third sub-prewrite data sector according to a first write command arranged to write a first prewrite data sector of the prewrite-data to the first logic address H_1. Furthermore, the controller 160 selects a first TLC-data block F_1 which is assigned to the first logic address H_1 from the first region R1, selects a second TLC-data block F_301, which is separated from the first TLC-data block F_1 by N/3 number of TLC-data blocks, from the second region R2, and selects a third TLC-data block F_601, which is separated from the first TLC-data block F_1 by 2N/3 number of TLC-data blocks, from the third region R3, wherein the first sub-prewrite data sector, the second sub-prewrite data sector and the third sub-prewrite data sector constitute the first prewrite data sector. Moreover, when the first TLC-data block F_1 assigned to the first logic address H_1 has valid data, the controller 160 may select another TLC-data block from the region having the first TLC-data block F_1 to replace the first TLC-data block F_1. Next, the controller 160 writes the first sub-prewrite data sector, the second sub-prewrite data sector and the third sub-prewrite data sector into the first TLC-data block F_1, the second TLC-data block F_301 and the third TLC-data block F_601 by the SLC storage mode, and maps the first TLC-data block F_1, the second TLC-data block F_301 and the third TLC-data block F_601 to the first logic address H_1. After the first write command is finished, the controller 160 further obtains a fourth sub-prewrite data sector, a fifth sub-prewrite data sector and a sixth sub-prewrite data sector according to a second write command arranged to write a second prewrite data sector of the prewrite-data to a second logic address H_2, selects a fourth TLC-data block F_2 which is assigned to the second logic address H_2 from the first region R1, selects a fifth TLC-data block F_302 which separated to the fourth TLC-data block F_2 by N/3 number of TLC-data blocks from the second region R2, and selects a sixth TLC-data block F_602 which separated to the fourth TLC-data block F_2 by 2N/3 number of TLC-data blocks from the third region R3. Moreover, when the fourth TLC-data block F_2 assigned to the first logic address H_2 has valid data, the controller 160 may select another TLC-data block from the region that includes the fourth TLC-data block F_2 to replace the fourth TLC-data block F_2. Next, the controller 160 writes the fourth sub-prewrite data sector into the fourth TLC-data block F_2, writes the fifth sub-prewrite data sector into fifth TLC-data block F_302, write the sixth sub-prewrite data sector into the sixth TLC-data block F_602 by the storage mode, and maps the fourth TLC-data block F_2, the fifth TLC-data block F_302 and the sixth TLC-data block F_602 to the second logic address H_2. After the second write command is finished, the controller 160 further selects a seventh TLC-data block F_3 which is assigned to the second logic address H_3 from the first region R1, selects an eighth TLC-data block F_303 which is separated from the seventh TLC-data block F_3 by N/3 number of TLC-data blocks from the second region R2, and selects a ninth TLC-data block F_603 which is separated from the seventh TLC-data block F_3 by 2N/3 TLC-data blocks from the third region R3 according to a third write command arranged to write a third prewrite data sector of the prewrite-data to a third logic address H_3. More specifically, when the seventh TLC-data block F_3 which is assigned to the first logic address H_1 has valid data, the controller 160 may select another TLC-data block from the region that includes the seventh TLC-data block F_3 to replace the seventh TLC-data block F_3. Next, the controller 160 writes the third prewrite data sector into the seventh TLC-data block F_3, the eighth TLC-data block F_303 and the ninth TLC-data block F_603 by the SLC storage mode, and maps the seventh TLC-data block F_3, the eighth TLC-data block F_303 and the ninth TLC-data block F_603 to the third logic address H_3, and so on, until the prewrite data sectors are all written to the indicated logic addresses.

In the second stage, the controller 160 further programs the sub-prewrite data sectors written in the TLC-data blocks into at least one of the TLC-spare blocks TLC_SP_0~TLC_SP_M. More specifically, the controller 160 selects a first TLC-spare block from the TLC-spare pool TLC_POOL for programming the data stored in the first TLC-data block, the second TLC-data block and the third TLC-data block, which are mapped to the first logic address, into the first TLC-spare block by a TLC storage mode. Next, the controller 160 further maps the programmed first TLC-spare block to the first logic address, and releases the first TLC-data block, the second TLC-data block and the third TLC-data block. After programming the data of the first TLC-data block, the second TLC-data block and the third TLC-data block, the controller 160 further selects a second TLC-spare block from the TLC-spare pool TLC_POOL, and programs the data written in the fourth TLC-data block, the fifth TLC-data block and the sixth TLC-data block which are mapped to the second logic address into the second TLC-spare block by the TLC storage mode. Next, the controller 160 further maps the programmed second TLC-spare block to the second logic address, and releases the fourth TLC-data block, the fifth TLC-data block and the sixth TLC-data block. After programming the data of the fourth TLC-data block, the fifth TLC-data block and the sixth TLC-data block, the controller 160 further selects a third TLC-spare block from the TLC-spare pool TLC_POOL, and programs the seventh TLC-data block, the eighth TLC-data block and the ninth TLC-data block which are mapped to the third logic address into the third TLC-spare block by the TLC storage mode. Next, the controller 160 further maps the programmed third TLC-spare block to the third logic address, and releases the seventh TLC-data block, the eighth TLC-data block and the ninth TLC-data block, and so on, until all of the sub-prewrite data sectors stored in the TLC-data blocks are programmed into the TLC-spare blocks TLC_SP_0~TLC_SP_M.

It should be noted that, in one of the embodiments, the step of programming the prewrite data sectors written in the TLC-data blocks into the TLC-spare blocks by the TLC storage mode is performed in the second stage and interlocked with the write operations indicated by a user command. The controller 160 programs the data in the TLC-data block of the logic address indicated by the user-write-command by the TLC storage mode to the first TLC-spare block according to the user-write-command arranged to write the logic address.

For example, the user wants to write data to the logic addresses H_301~H_303. First, the controller 160 selects a first TLC-spare block TLC_SP_6 from the TLC-spare pool TLC_POOL and locates the first logic address H_1 which is mapped to the second TLC-data block F_301 assigned to the logic address H_301 according to a first user-write-command arranged to write the logic address H_301. Next, the controller 160 programs the data written in the first TLC-data block F_1, the second TLC-data block F_301 and the third TLC-data block F_601 which are mapped to the first logic address H_1 into the first TLC-spare block TLC_SP_6 by the TLC storage mode. Next, the controller 160 further maps the programmed first TLC-spare block TLC_SP_6 to the first logic address H_1, and releases the first TLC-data block F_1, the second TLC-data block F_301 and the third TLC-data block F_601. After programming the data of the first TLC-data block F_1, the second TLC-data block F_301 and the third TLC-data block F_601, the controller 160 select three SLC-spare blocks from the SLC-spare pool SLC_POOL to write the data which is supposed to be written to the logic address H_301 into the selected SLC-spare blocks by SLC storage mode according to the first user-write-command. Next, the controller 160 selects a fourth TLC-spare block TLC_11 from the TLC-spare pool TLC_POO, and programs the data in the selected SLC-spare blocks which are written by the data supposed to be written to the logic address H_301 into the fourth TLC-spare block TLC_11 by the TLC storage mode. Next, the controller 160 exchanges the programmed fourth TLC-spare block TLC_11 with the second TLC-data block F_301 for pushing the second TLC-data block F_301 assigned to the logic address H_301 into the TLC-spare pool TLC_POOL and mapping the programmed fourth TLC-spare block TLC_11 to the logic address H_301.

After the first user-write-command is finished, the controller 160 selects a second TLC-spare block TLC_SP_13 from the TLC-spare pool TLC_POOL and locates the second logic address H_2 which is mapped to the fifth TLC-data block F_302 assigned to the logic address H_302 according to the second user-write-command arranged to write the logic address H_302. The controller 160 programs the data stored in the fourth TLC-data block F_2, the fifth TLC-data block F_302 and the sixth TLC-data block F_602 which are mapped to the second logic address H_2 into the second TLC-spare block TLC_SP_13 by the TLC storage mode. Next, the controller 160 further maps the programmed second TLC-spare block TLC_SP_13 to the second logic address H_2, and releases the fourth TLC-data block F_2, the fifth TLC-data block F_302 and the sixth TLC-data block F_602. After programming the data of the fourth TLC-data block F_2, the fifth TLC-data block F_302 and the sixth TLC-data block F_602, the controller 160 selects three SLC-spare blocks from the SLC-spare pool SLC_POOL to write the data which is supposed to be written to the logic address H_302 into the selected SLC-spare blocks by SLC storage mode according to the second user-write-command. Next, the controller 160 selects a fifth TLC-spare block TLC_2 from the TLC-spare pool TLC_POOL, and programs the data in the selected SLC-spare blocks which are written by the data supposed to be written to the logic address H_302 into the fifth TLC-spare block TLC_2 by the TLC storage mode. Next, the controller 160 exchanges the programmed fifth TLC-spare block TLC_2 with the fifth TLC-data block F_302 for pushing the fifth TLC-data block F_302 assigned to the logic address H_302 into the TLC-spare pool TLC_POOL and mapping the programmed fifth TLC-spare block TLC_2 to the logic address H_302.

After the second user-write-command is finished, the controller 160 selects a third TLC-spare block TLC_SP_24 from the TLC-spare pool TLC_POOL and locates the second logic address H_3 which is mapped to the eighth TLC-data block F_303 assigned to the logic address H_303 according to the third user-write-command arranged to write the logic address H_303. The controller 160 programs the data of the seventh TLC-data block F_3, the eighth TLC-data block F_303 and the ninth TLC-data block F_603 which are mapped to the third logic address H_3 into the third TLC-spare block TLC_SP_24 by the TLC storage mode. Next, the controller 160 maps the programmed third TLC-spare block TLC_SP_24 to the third logic address H_3, and releases the seventh TLC-data block F_3, the eighth TLC-data block F_303 and the ninth TLC-data block F_603. After programming the data of the seventh TLC-data block F_3, the eighth TLC-data block F_303 and the ninth TLC-data block F_603, the controller 160 selects three SLC-spare blocks from the SLC-spare pool SLC_POOL to write the data which is supposed to be written to the logic address H_303 into the selected SLC-spare blocks by SLC storage mode according to the third user-write-command. Next, the controller 160 selects a sixth TLC-spare block TLC_9 from the TLC-spare pool TLC_POOL, and programs the data in the selected SLC-spare blocks which are written by the data supposed to be written to the logic address H_303 into the sixth TLC-spare block TLC_9 by the TLC storage mode. Next, the controller 160 exchanges the programmed sixth TLC-spare block TLC_9 with the eighth TLC-data block F_303 for pushing the eighth TLC-data block F_303 assigned to the logic address H_303 into the TLC-spare pool TLC_POOL and mapping the programmed sixth TLC-spare block TLC_9 to the logic address H_303.

The controller 160 further selects a second TLC-spare block from the TLC-spare pool TLC_POOL, and programs the data of the fourth TLC-data block, the fifth TLC-data block and the sixth TLC-data block which are mapped to the second logic address into the second TLC-spare block by a TLC storage mode. Next, the controller 160 further maps the programmed second TLC-spare block to the second logic address, and pushes the fourth TLC-data block to the TLC-spare pool TLC_POOL. After programming the data of the fourth TLC-data block, the fifth TLC-data block and the sixth TLC-data block, the controller 160 further selects a third TLC-spare block from the TLC-spare pool TLC_POOL, and programs the data of the seventh TLC-data block, the eighth TLC-data block and the ninth TLC-data block which are mapped to the third logic address into the third TLC-spare block by the TLC storage mode. Next, the controller 160 further maps the programmed third TLC-spare block to the third logic address and pushes the seventh TLC-data block to the TLC-spare pool TLC_POOL.

Figure 6:
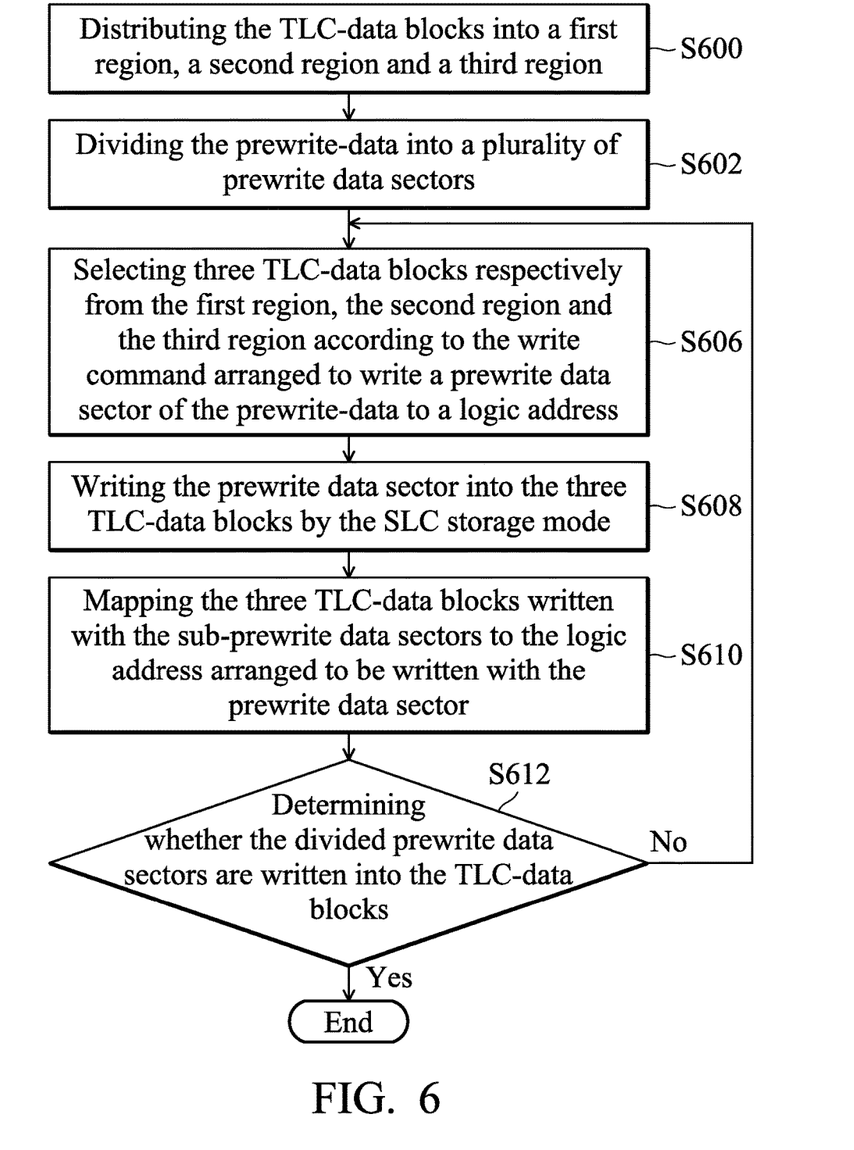
FIG. 6 is a flowchart of a data maintenance method constructed in accordance with an embodiments.

FIG. 6 is a flowchart of a data maintenance method constructed in accordance with an embodiment. The data maintenance method is applied to the data storage device 140 of FIG. 1, wherein the data maintenance method is arranged to write the prewrite-data to at least one of the logic addresses H_1~H_N according to the order of the logic addresses H_1~H_N in a first stage. The process starts at step S600.

In step S600, the controller 160 distributes the TLC-data blocks F_1~F_N into a first region R1, a second region R2 and a third region R3. In one of the embodiments, when the total number of logic addresses is "N", each of the first region R1, the second region R2 and the third region R3 has N/3 number of logic addresses, N/3 number of TLC-data blocks assigned to the N/3 logic addresses, and the addresses of each of the first region R1, the second region R2 and the third region R3 are in sequence, as shown in FIG. 3, but it is not limited thereto. Namely, the first region R1 includes the logic addresses H_1~H_N/3 having sequential addresses, and includes the TLC-data blocks F_1~F_N/3 having sequential addresses. The second region R2 includes the logic addresses H_N/3+1~H_2N/3 having sequential addresses, and the TLC-data blocks F_N/3+1~F_2N/3 having sequential addresses. The third region R3 includes the logic addresses H_2N/3+1~H_N having sequential addresses, and the TLC-data block F_2N/3+1~F_N having sequential addresses. For example, when the total number of logic addresses H_0~H_N is 900, the first region R1 has the logic addresses H_1~H_300 and the TLC-data blocks F_1~F_300, the second region R2 has the logic addresses H_301~H_600 and the TLC-data blocks F_301~F_600, and the third region R3 has the logic addresses H_601~H_900 and the TLC-data blocks F_601~F_900, as shown in FIG. 4. In other embodiments, "N" can be other rational numbers. Moreover, when "N" cannot be divided evenly by 3, the controller 160 can ignore the remaining one or two TLC-data blocks. For example, "N" is 900 when the total number of TLC-data blocks is 901, and "N" is 1200 when the total number of TLC-data blocks is 1202, but it is not limited thereto.

Next, in step S602, the controller 160 divides the prewrite-data into a plurality of prewrite data sectors. It should be noted that the controller 160 divides the prewrite-data into the prewrite data sectors according to the size of the triple-level cell. Namely, the data length of each of the prewrite data sectors is equal to the data length of the triple-level cell and is three times the data length of the single-level cell.

Next, in step S606, the controller 160 selects three TLC-data blocks respectively from the first region R1, the second region R2 and the third region R3 according to the write command arranged to write a prewrite data sector of the prewrite-data to a logic address. It should be noted that, in one of the embodiments, the controller 160 selects a TLC-data block from the first region R1 according to the TLC-data block assigned to the logic address arranged to be written with the prewrite data sector. Namely, the logic address of the TLC-data block selected by the controller 160 from the first region R1 is the logic address arranged to be written with the prewrite data sector. Moreover, the address of the first TLC-data block plus N/3 is equal to the address of the second TLC-data block, and the address of the first TLC-data block plus (2N)/3 is equal to the addresses of the third TLC-data block. For example, the controller 160 selects a first TLC-data block F_1 which is assigned to the first logic address H_1 from the first region R1, selects a second TLC-data block F_301, which is separated from the first TLC-data block F_1 by N/3 number of TLC-data blocks, from the second region R2, and selects a third TLC-data block F_601, which is separated from the first TLC-data block F_1 by 2N/3 number of TLC-data blocks, from the third region R3 according to a first write command arranged to write a first prewrite data sector of the prewrite-data to a first logic address H_1, but it is not limited thereto.

Next, in step S608, the controller 160 writes the prewrite data sector into the three TLC-data blocks selected in the step S606 by the SLC storage mode.

Next, in step S610, the controller 160 maps the three TLC-data blocks written with the sub-prewrite data sectors to the logic address arranged to be written with the prewrite data sector. For example, when the prewrite data sector is a first prewrite data sector which is supposed (indicated) to be written to the first logic address H_1 and the controller 160 selected the first TLC-data block F_1, the second TLC-data block F_301 and the third TLC-data block F_601 in step S606, the controller 160 writes the first prewrite data sector into the first TLC-data block F_1, the second TLC-data block F_301 and the third TLC-data block F_601 by the SLC storage mode. Next, the controller 160 maps the first TLC-data block F_1, the second TLC-data block F_301 and the third TLC-data block F_601 to the first logic address H_1.

Next, in step S612, the controller 160 determines whether the divided prewrite data sectors are written into the TLC-data blocks. When all of the prewrite data sectors are written into the TLC-data blocks, the process ends at step S602. When all of the prewrite data sectors are not written into the TLC-data block, the process returns to step S606 to continues to write the remaining prewrite data sectors into the TLC-data blocks according to the order of the logic addresses H_1~H_N.

Figure 7:
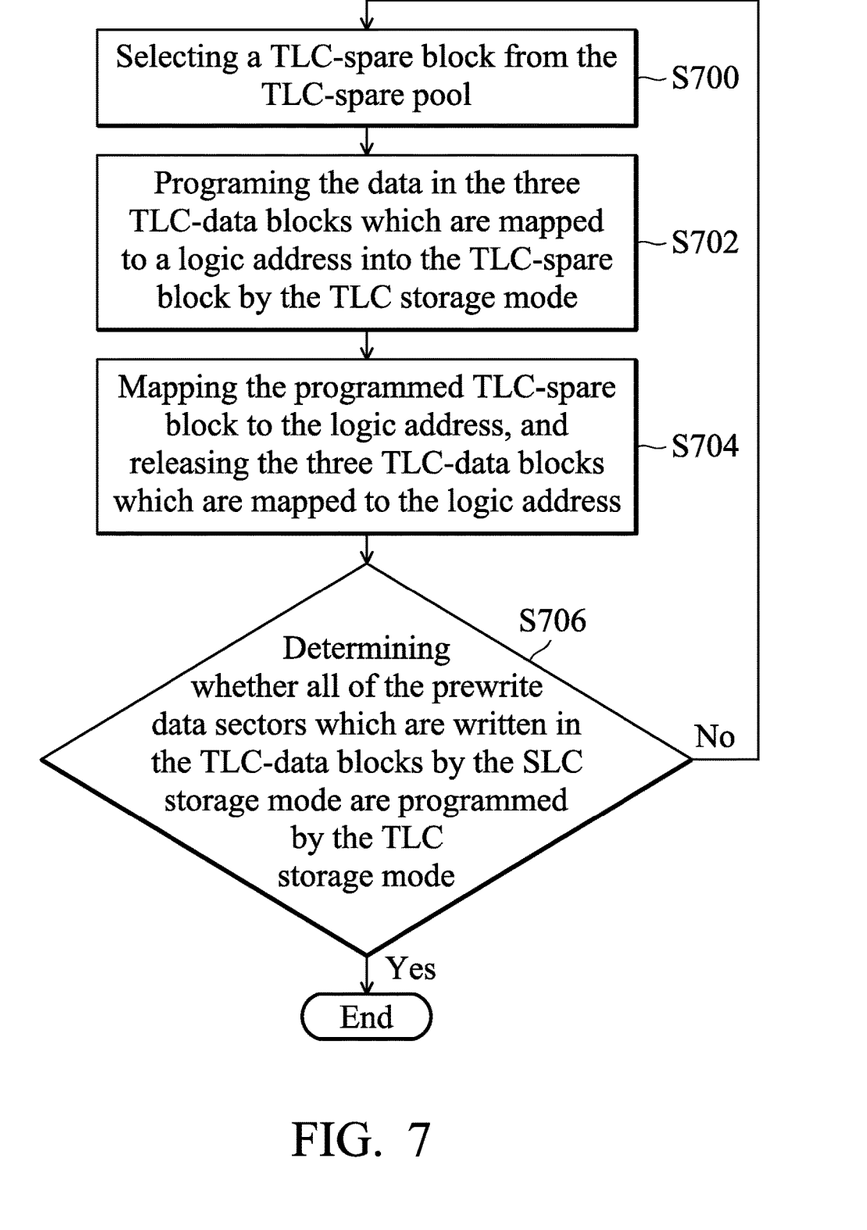
FIG. 7 is a flowchart of a data maintenance method constructed in accordance with another embodiment.

FIG. 7 is a flowchart of a data maintenance method constructed in accordance with another embodiment. The data maintenance method is applied to the data storage device 140 of FIG. 1, wherein the data maintenance method is arranged to program the prewrite data sectors in the TLC-data blocks into at least one of the TLC-spare blocks TLC_SP_0~TLC_SP_M in the second stage. The process starts at step S700.

In step S700, the controller 160 selects a TLC-spare block from the TLC-spare pool TLC_POOL.

Next, in step S702, the controller 160 programs the data in the three TLC-data blocks which are mapped to a logic address into the TLC-spare block selected in step S700 by the TLC storage mode.

Next, in step S704, the controller 160 further maps the programmed TLC-spare block to the logic address, and releases the three TLC-data blocks which are mapped to the logic address.

Next, in step S706, the controller 160 determines whether all of the prewrite data sectors which are written in the TLC-data blocks by the SLC storage mode are programmed by the TLC storage mode. When all of the prewrite data sectors stored in the TLC-data blocks by the SLC storage mode are programmed by the TLC storage mode, the process ends at step S706, otherwise, the process goes to step S700 to continue to program the TLC-data blocks that haven't been programmed by the TLC storage mode to be programmed by the TLC storage mode. For example, the controller 160 selects a first TLC-spare block from the TLC-spare pool TLC_POOL and programs the data of the first TLC-data block, the second TLC-data block and the third TLC-data block which are mapped to the first logic address into the first TLC-spare block by a TLC storage mode. Next, the controller 160 further maps the programmed first TLC-spare block to the first logic address and releases the first TLC-data block, the second TLC-data block and the third TLC-data block. After programming the data of the first TLC-data block, the second TLC-data block and the third TLC-data block, the controller 160 further selects a second TLC-spare block from the TLC-spare pool TLC_POOL, and programs the data of the fourth TLC-data block, the fifth TLC-data block and the sixth TLC-data block which are mapped to the second logic address into the second TLC-spare block by the TLC storage mode. Next, the controller 160 further maps the programmed second TLC-spare block to the second logic address and releases the fourth TLC-data block, the fifth TLC-data block and the sixth TLC-data block. After programming the data of the fourth TLC-data block, the fifth TLC-data block and the sixth TLC-data block, the controller 160 further selects a third TLC-spare block from the TLC-spare pool TLC_POOL, and programs the data of the seventh TLC-data block, the eighth TLC-data block and the ninth TLC-data block which are mapped to the third logic address into the third TLC-spare block by the TLC storage mode. Next, the controller 160 further maps the programmed third TLC-spare block to the third logic address and releases the seventh TLC-data block, the eighth TLC-data block and the ninth TLC-data block, and so on, until all of the sub-prewrite data sectors in the TLC-data block are programmed into the TLC-spare blocks TLC_SP_0~TLC_SP_M.

Figure 8A:
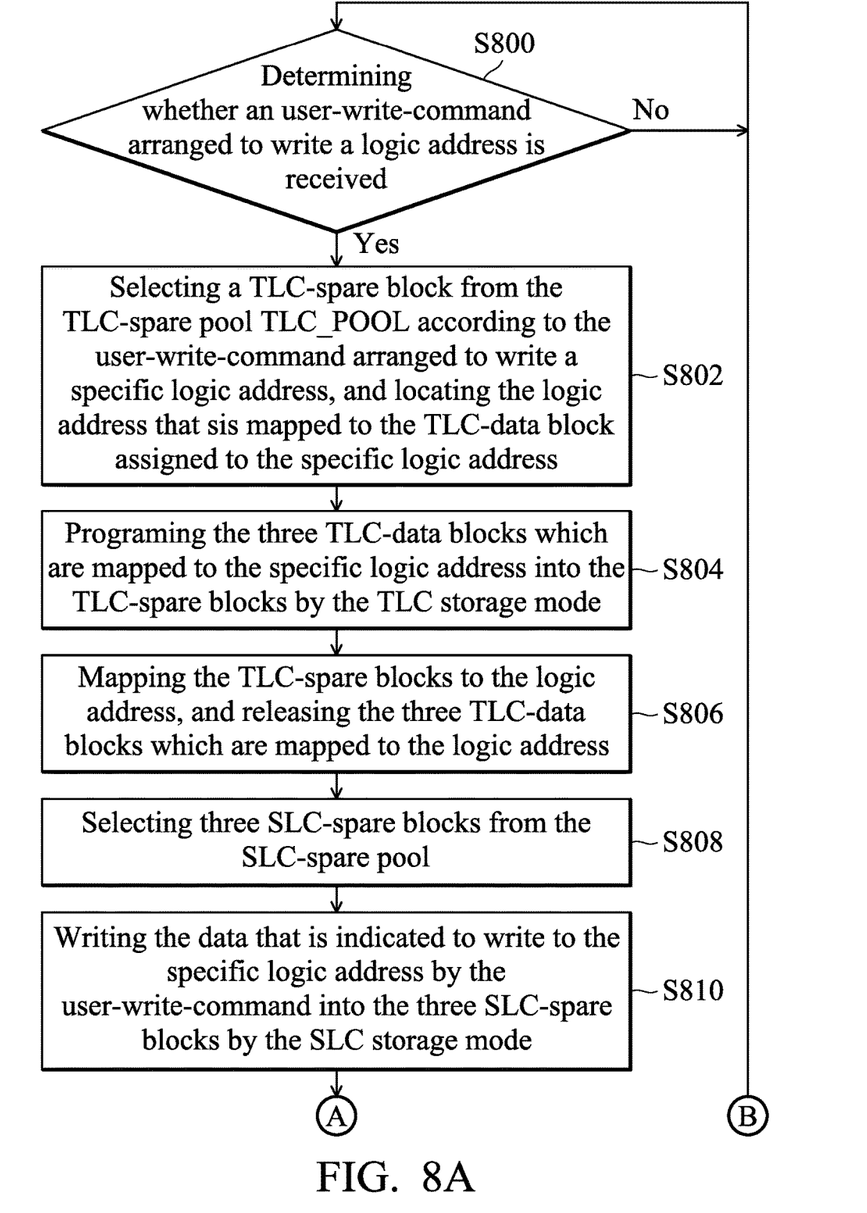
FIGS. 8A-8B are a flowchart of a data maintenance method constructed in accordance with another embodiment.
Figure 8B:
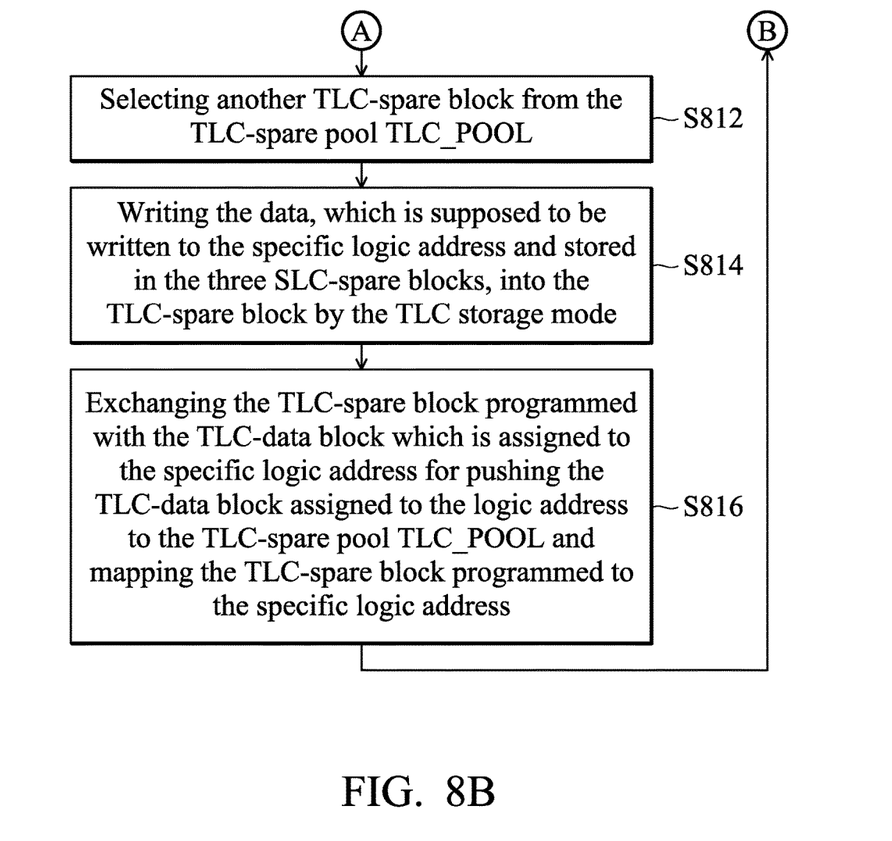

FIGS. 8A-8B are a flowchart of a data maintenance method constructed in accordance with another embodiment. The data maintenance method is applied to the data storage device 140 of FIG. 1, wherein the data maintenance method is arranged to program the prewrite data sectors of the TLC-data blocks into the TLC-spare blocks TLC_SP_0~TLC_SP_M in the second stage, wherein the step of programming the data of the TLC-data blocks into the TLC-spare blocks is interlocked with the write operations indicated by a user command. Namely, the controller 160 programs the data of the TLC-data blocks which are mapped to the logic address and indicated by the user-write-command into the first TLC-spare block by the TLC storage mode according to the user-write-command arranged to write the logic address. The process starts at step S800.

In step S800, the controller 160 determines whether an user-write-command arranged to write a logic address is received. When the controller 160 receives the user-write-command arranged to write the logic address, the process goes to step S802, otherwise, the controller 160 continues to determine whether an user-write-command arranged to write a logic address is received.

In step S802, the controller 160 selects a TLC-spare block from the TLC-spare pool TLC_POOL according to the user-write-command arranged to write a specific logic address, and locates the logic address that sis mapped to the TLC-data block assigned to the specific logic address.

Next, in step S804, the controller 160 programs the three TLC-data blocks which are mapped to the specific logic address of the step S802 into the TLC-spare blocks selected in step S802 by the TLC storage mode.

Next, in step S806, the controller 160 further maps the TLC-spare blocks programmed in step S804 to the logic address located in step S802, and releases the three TLC-data blocks which are mapped to the logic address located in step S802.

Next, in step S808, the controller 160 selects three SLC-spare blocks from the SLC-spare pool.

Next, in step S810, the controller 160 writes the data that is indicated to write to the specific logic address by the user-write-command into the three SLC-spare blocks selected in step S808 by the SLC storage mode.

Next, in step S812, the controller 160 selects another TLC-spare block from the TLC-spare pool TLC_POOL.

Next, in step S814, the controller 160 writes the data, which is supposed to be written to the specific logic address and stored in the three SLC-spare blocks, into the TLC-spare block selected in step S812 by the TLC storage mode.

Next, in step S816, the controller 160 exchanges the TLC-spare block programmed in the step S814 with the TLC-data block which is assigned to the specific logic address for pushing the TLC-data block assigned to the logic address to the TLC-spare pool TLC_POOL and mapping the TLC-spare block programmed in the step S814 to the specific logic address. For example, the controller 160 receives the first user-write-command arranged to write the logic address H_301 (the specific logic address) in step S800. Taking the embodiment of FIG. 5 as an example, the controller 160 selects a first TLC-spare block TLC_SP_6 from the TLC-spare pool TLC_POOL and locates the first logic address H_1 mapped to the second TLC-data block F_301 that is assign to the logic address H_301 according to the first user-write-command arranged to write the logic address H_301 (step S802). Next, the controller 160 programs the data of the first TLC-data block F_1, the second TLC-data block F_301 and the third TLC-data block F_601 which are mapped to the first logic address H_1 into the first TLC-spare block TLC_SP_6 by the TLC storage mode (step S804). Next, the controller 160 further maps the programmed first TLC-spare block TLC_SP_6 to the first logic address H_1, and releases the first TLC-data block F_1, the second TLC-data block F_301 and the third TLC-data block F_601 (step S806). After programming the data of the first TLC-data block F_1, the second TLC-data block F_301 and the third TLC-data block F_601, the controller 160 selects three SLC-spare blocks from the SLC-spare pool SLC_POOL (step S808) for writing the data supposed to be written to the logic address H_301 into the selected three SLC-spare blocks by SLC storage mode according to the first user-write-command (step S810). Next, the controller 160 selects a fourth TLC-spare block TLC_11 from the TLC-spare pool TLC_POOL (step S812), and programs the data supposed to be written to the logic address H_301 into the fourth TLC-spare block TLC_11 by the TLC storage mode (step S814). Next, the controller 160 exchanges the programmed fourth TLC-spare block TLC_11 with the second TLC-data block F_301 for pushing the second TLC-data block F_301 assigned to the logic address H_301 into the TLC-spare pool TLC_POOL and mapping the logic address H_301 to the programmed fourth TLC-spare block TLC_11 (step S816).

Next, the process returns to step S800, the controller 160 continues to determine whether the user-write-command is received. It should be noted that, if the controller 160 does not receive the user-write-command, the controller 160 can perform the process of FIG. 7 in the back ground when the data storage device 140 is idle. Namely, the processes of FIG. 7 and FIG. 8A-8B can be performed in parallel.

As described above, the data storage device and the data maintenance method of the present invention can temporarily store the data, which is arranged to be written by MLC mode, by the SLC mode in a predetermined order.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, having a plurality of Single-Level Cell (SLC)-spare blocks, a plurality of TLC-data blocks, and a plurality of Triple-Level Cell (TLC)-spare blocks; and
   a controller, equally distributing the TLC-data blocks into three regions, the regions have the same number of TLC-data blocks, the controller further receives a pre-write data sector and a logic address of the prewrite data sector, and obtains a first sub-prewrite data sector, a second sub-prewrite data sector and a third sub-prewrite data sector according to the prewrite data sector and the logic address, wherein in a first stage, the controller further determines a first TLC-data block corresponding to the logic address according to the logic address, defines the region that contains the first TLC-data block as a first region, and determines whether the first TLC-data block has valid data, wherein in a first state, when the first TLC-data block does not have valid data, the controller respectively selects a second TLC-data block and a third TLC-data block from the regions other than the first region according to the first TLC-data block, respectively writes the first sub-prewrite data sector, the second sub-prewrite data sector and the third sub-prewrite data sector into the first TLC-data block, the second TLC-data block and the third TLC-data block by a SLC storage mode, and maps the first TLC-data block, the second TLC-data block and the third TLC-data block to the logic address.

2. The data storage device as claimed in claim 1, wherein total number of TLC-data blocks is N, each of the TLC-data blocks has an address, and the addresses of the TLC-data blocks are in sequence.

3. The data storage device as claimed in claim 2, wherein the address of the first TLC-data block plus N/3 is equal to the address of the second TLC-data block, the address of the first TLC-data block plus (2N)/3 is equal to the addresses of the third TLC-data block.

4. The data storage device as claimed in claim 1, wherein in a second stage, the controller further programs the data in the first TLC-data block, the second TLC-data block and the third TLC-data block into one of the TLC-spare blocks, wherein the controller selects a first TLC-spare block from the TLC-spare blocks to program the data of the first TLC-data block, the second TLC-data block and the third TLC-data block, which are mapped to the logic address, into the first TLC-spare block by a TLC storage mode, maps the first TLC-spare block to the logic address, and releases the first TLC-data block, the second TLC-data block and the third TLC-data block.

5. The data storage device as claimed in claim 4, wherein the first stage is Production Phase, the second stage is Integration Phase after the first stage, and the data storage device goes through a high temperature soldering event between the first stage and the second stage.

6. The data storage device as claimed in claim 4, wherein the step of programming the data in the first TLC-data block, the second TLC-data block and the third TLC-data block into the first TLC-spare block by the TLC storage mode is performed in the second stage and interlocked with a write operation indicated by a user command.

7. The data storage device as claimed in claim 1, wherein in a second stage, the controller further receives an user-write-command, and determines whether a specific TLC-data block of a specific logic address indicated by the user-write-command has the prewrite data sector according to the user-write-command.

8. The data storage device as claimed in claim 7, wherein when the specific TLC-data block has the prewrite data sector, the controller obtains a second logic address that maps to the specific TLC-data block corresponding to the specific logic address, selects a second TLC-spare block from the TLC-spare pool, programs data in the specific TLC-data block and the other two TLC-data blocks that are mapped to the second logic address into the second TLC-spare block by a TLC storage mode to release the specific TLC-data block and the other two TLC-data blocks that are mapped to the second logic address.

9. A data maintenance method, applied to a data storage device having a plurality of Single-Level Cell (SLC)-spare blocks, a plurality of Triple-Level Cell (TLC)-data blocks, and a plurality of TLC-spare blocks, the data maintenance method comprising:
  receiving a prewrite data sector and a logic address of the prewrite data sector, and obtaining a first sub-prewrite data sector, a second sub-prewrite data sector and a third sub-prewrite data sector according to the prewrite data sector and the logic address;
  writing a prewrite data sector into at least one of the TLC-data blocks according to the logic address in a first stage, wherein the step of writing the prewrite data sector into the at least one of the TLC-data blocks according to the logic address further comprises:
  equally distributing the TLC-data blocks into three regions, wherein the regions have the same number of TLC-data blocks;
  determining a first TLC-data block corresponding to the logic address according to the logic address, and defining the region that contains the first TLC-data block as a first region;
  determining whether the first TLC-data block has valid data;
  selecting a second TLC-data block and a third TLC-data block, respectively, from the regions other than the first region according to the first TLC-data block when the first TLC-data block does not have valid data;
  respectively writing the first sub-prewrite data sector, the second sub-prewrite data sector and the third sub-prewrite data sector into the first TLC-data block, the second TLC-data block and the third TLC-data block by a SLC storage mode; and
  mapping the first TLC-data block, the second TLC-data block and the third TLC-data block to the logic address.

10. The data maintenance method as claimed in claim 9, wherein total number of TLC-data blocks is N, each of the TLC-data blocks has an address, and the addresses of the TLC-data blocks are in sequence.

11. The data maintenance method as claimed in claim 10, wherein the address of the first TLC-data block plus N/3 is equal to the address of the second TLC-data block, the address of the first TLC-data block plus (2N)/3 is equal to the addresses of the third TLC-data block.

12. The data maintenance method as claimed in claim 9, further comprising:
  programming the data in the first TLC-data block, the second TLC-data block and the third TLC-data block into one of the TLC-spare blocks in a second stage, wherein the step of programming the data in the first TLC-data block, the second TLC-data block and the third TLC-data block into one of the TLC-spare blocks further comprises:
  selecting a first TLC-spare block from the TLC-spare blocks;
  programming the data of the first TLC-data block, the second TLC-data block and the third TLC-data block, which are mapped to the logic address, into the first TLC-spare block by a TLC storage mode;
  mapping the first TLC-spare block to the logic address; and
  releasing the first TLC-data block, the second TLC-data block and the third TLC-data block.

13. The data maintenance method as claimed in claim 12, wherein the first stage is Production Phase, the second stage is Integration Phase after the first stage, and the data storage device goes through a high temperature soldering event between the first stage and the second stage.

14. The data maintenance method as claimed in claim 12, wherein the step of programming the data in the first TLC-data block, the second TLC-data block and the third TLC-data block into the first TLC-spare block by the TLC storage mode is performed in the second stage and interlocked with a write operation indicated by a user command.

15. The data maintenance method as claimed in claim 9, further comprising:
  receiving an user-write-command in a second stage; and
  determining whether a specific TLC-data block of a specific logic address indicated by the user-write-command has the prewrite data sector according to the user-write-command.

16. The data maintenance method as claimed in claim 15, further comprising:
  obtaining a second logic address that maps to the specific TLC-data block corresponding to the specific logic address when the specific TLC-data block has the prewrite data sector;
  selecting a second TLC-spare block from the TLC-spare pool; and
  programming data in the specific TLC-data block and the other two TLC-data blocks that are mapped to the second logic address into the second TLC-spare block by a TLC storage mode to release the specific TLC-data block and the other two TLC-data blocks that are mapped to the second logic address.

* * * * *